United States Patent [19]
Feng

[11] Patent Number: 5,313,806
[45] Date of Patent: May 24, 1994

[54] INTEGRAL AIR CONDITIONER OF WHICH AN INDOOR UNIT AND AN OUTDOOR UNIT ARE CONNECTED WITH VIBRATION DAMPERS

[76] Inventor: Chun Feng, Vocational University of Zigong City, Sichuan Province, China

[21] Appl. No.: 233

[22] Filed: Jan. 4, 1993

[30] Foreign Application Priority Data

Jan. 9, 1992 [CN] China .............................. 92214040.5
Jun. 11, 1992 [CN] China .............................. 92108170.7

[51] Int. Cl.$^5$ ............................................. F25D 19/00
[52] U.S. Cl. .......................................... 62/295; 62/262; 62/296
[58] Field of Search ................. 62/262, 263, 295, 296, 62/297, 267; 248/632, 638

[56] References Cited

U.S. PATENT DOCUMENTS

| | | | |
|---|---|---|---|
| 3,176,474 | 4/1965 | Abbott | 62/262 |
| 4,051,693 | 10/1977 | Needham | 62/263 |
| 5,167,131 | 12/1992 | Karkhanis | 62/262 |
| 5,191,770 | 3/1993 | Kim | 62/263 |

FOREIGN PATENT DOCUMENTS 2061668 5/1990 China .
58-73250 2/1983 Japan .

*Primary Examiner*—John M. Sollecito
*Attorney, Agent, or Firm*—Majestic, Parsons, Siebert & Hsue

[57] ABSTRACT

The present invention discloses an integral air-conditioner of which an indoor portion and an outdoor portion are connected elastically, the air-conditioner includes an indoor portion (1), an outdoor portion (3), and a means for elastically connecting the indoor portion and outdoor portion integrally. The integral air-conditioner according to the present invention retains all the advantages exhibited by the window air-conditioner and the divided air-conditioner in the prior art, meanwhile overcomes their drawbacks. The integral air-conditioner according to the present invention can be easily mounted and maintained, and has a lower noise intensity which is only ½ of that of the window air-conditioner in the prior art. The air-conditioner according to the present invention is an ideal air-conditioning apparatus.

7 Claims, 3 Drawing Sheets

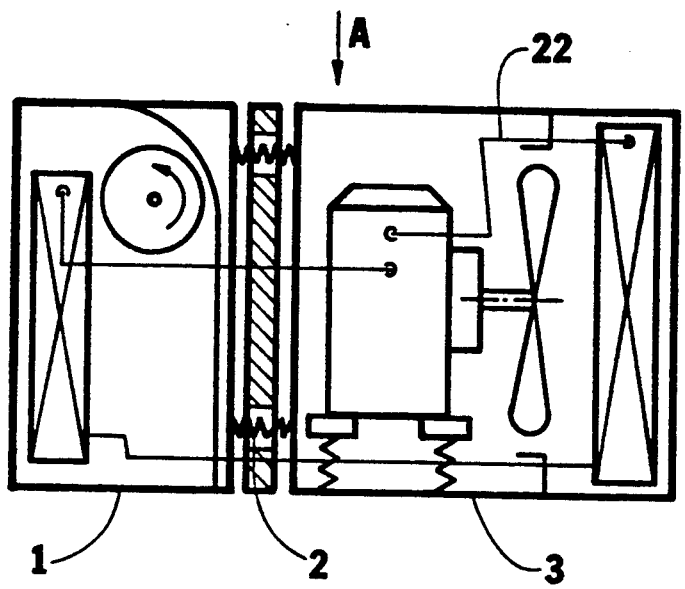
fig.__1.
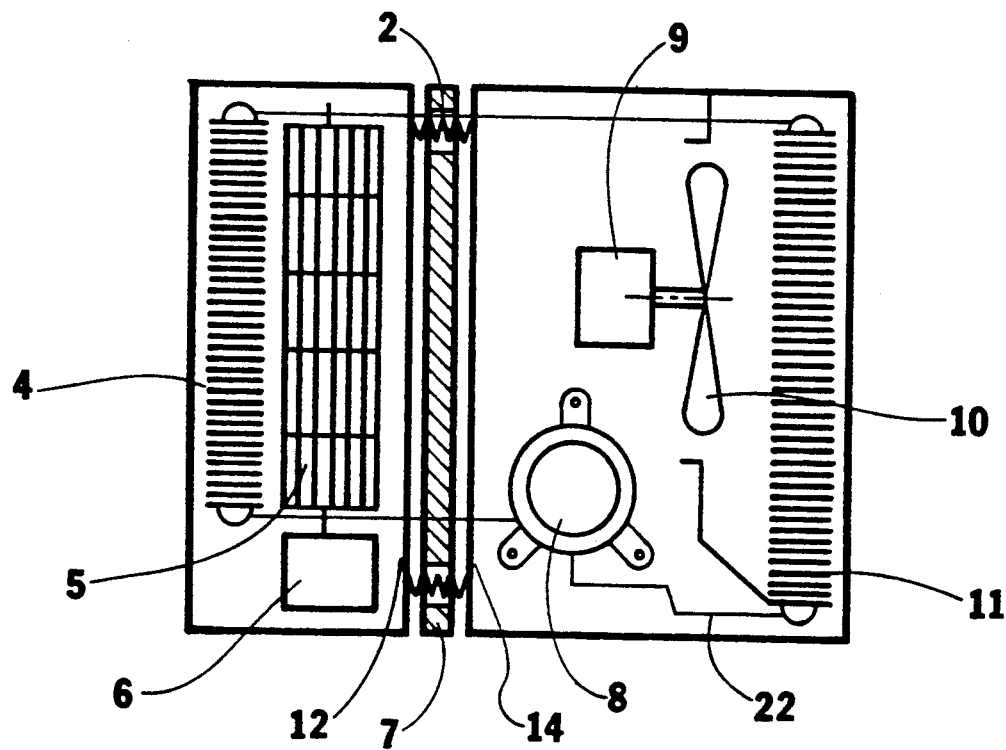
fig.__2.

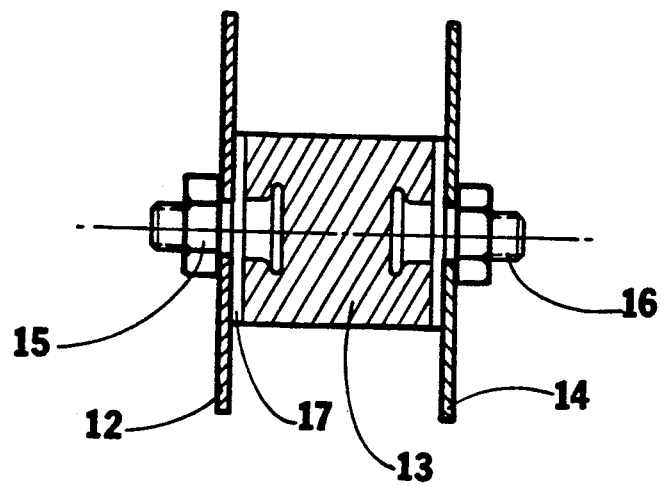
fig._3.
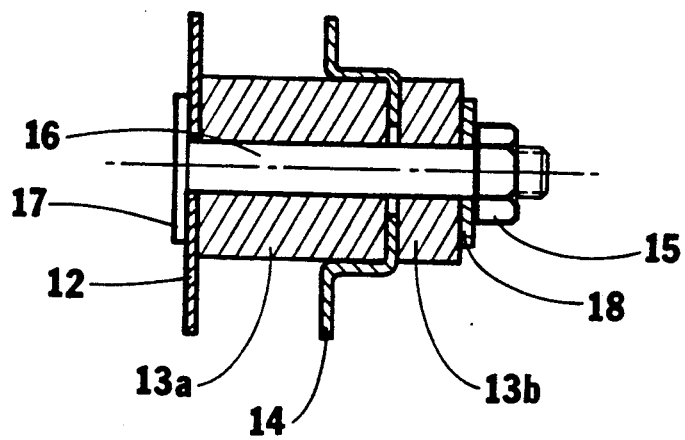
fig._4.
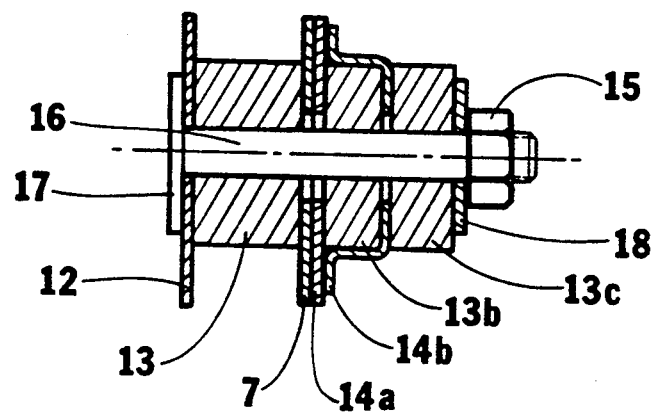
fig._5.

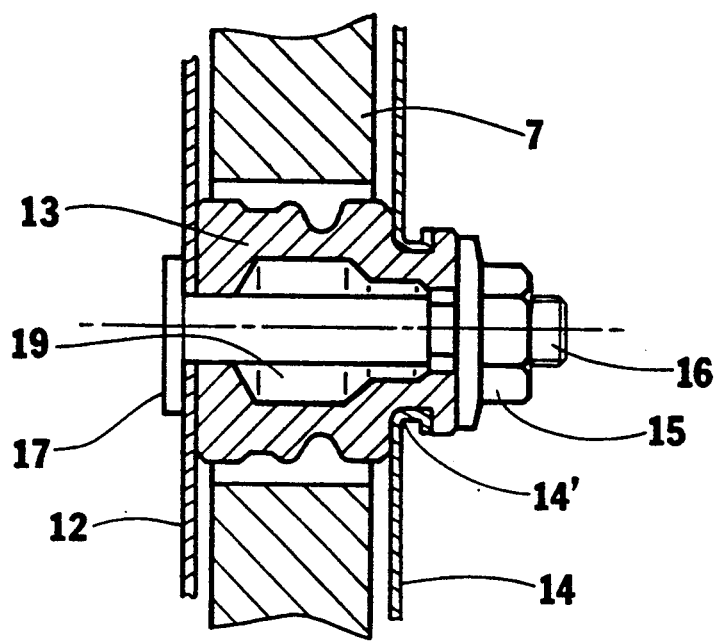
fig.—6.

5,313,806

INTEGRAL AIR CONDITIONER OF WHICH AN INDOOR UNIT AND AN OUTDOOR UNIT ARE CONNECTED WITH VIBRATION DAMPERS

TECHNICAL FIELD OF THE INVENTION

The present invention relates to an air conditioning apparatus for adjusting room temperature, and adaptive to be used in houses, hotels, offices and laboratories, more particularly, this invention relates to an integral air conditioner of which an indoor unit and an outdoor unit are connected elastically.

BACKGROUND ART

Room air conditioners are used widely throughout the world, typical types of which are window air conditioners and separate air conditioners. Window air conditioner generally consists of an indoor heat exchanger, an indoor centrifugal blower, a sound absorbing plate, a motor, a compressor, an outdoor heat exchanger and an outdoor axial fan. It is easily mounted and is very reliable and economic, however the high operating noise can make people difficult to sleep or work. A separate air conditioner has been developed to overcome the drawbacks of the window air conditioners, which consists of an indoor heat exchanger, an indoor motor, an indoor crossflow blower, pipes for connecting the indoor unit and the outdoor portion, an outdoor heat exchanger, an outdoor motor, a compressor, low and high pressure valves, and an outdoor axial fan. While this kind of separate air conditioner overcomes drawbacks of the window air conditioner, such as high noise, mounting is very complicated. In particular, the pipeline system and power supply line are difficult to fit and connect in tall buildings, and this results in high cost.

SUMMARY OF THE INVENTION

The foregoing drawbacks have been overcome by the integral air conditioner of the invention.

The object of the present invention is to provide an integral air conditioner of which an indoor unit and an outdoor unit are connected elastically in order to reduce noise transmission into the area being served by the air conditioner and to be easily mountable.

According to the invention, an integral air conditioner consists of an indoor unit and an outdoor unit which are connected by an elastic connecting means, wherein the indoor unit includes an indoor motor, an indoor crossflow blower, and an indoor heat exchanger, and the outdoor unit includes an outdoor motor, an outdoor fan, and a compressor, all of which are the primary sources of noise transmitted into the area being served by the air conditioner. A sound absorbing plate is set in close proximity to and between said indoor unit and said outdoor unit wall panels. The integral air conditioner of the present invention has a noise reduction effect similar to a divided air conditioner and its integral structure has the low cost and easy mounting characteristics of a window air conditioner.

The means for elastically connecting the two units of the air conditioner of the present invention can be any connecting means by which two unit of an air conditioner can be connected integrally but elastically, for example, a) a connecting means formed by molding a rubber tube containing two bolts, each of which has an integrally formed washer; b) supporting connecting means consisting of a bolt having an integrally formed end washer, a rubber supporting washer, a rubber washer, a metal washer and a nut; c) cross supporting connecting means, consisting of a bolt having an integrally formed end washer, a rubber supporting washer, a rubber intermediate washer sandwiched between two wall panels of the outdoor portion, a rubber washer, a metal washer, and a nut; d) hollow rubber washer connecting means, consisting of a bolt with end washer, a hollow rubber washer with an outer undulate surface, and a nut with an integrally formed washer.

In contrast to separate air conditioner, the integral air conditioner of the invention can: 1) be mounted integrally without the need for connection of pipelines and power supply lines between the indoor unit and the outdoor unit; 2) eliminate movable connectors which will cause leakage of the refrigerant, enhancing the reliability; 3) be easily mounted in a high building which has no balcony; 4) reduce cost, and 5) be easily maintained. In contrast to a window air conditioner, the noise transmission into the area being served by the air conditioner is, lower obviously. The inventor has measured the noise intensities caused by a window air conditioner of the prior art and the integral air conditioner of the present invention having the same power as the former. The result of the tests shows that the noise intensity transmitted by the latter into the area being served is reduced by 6 dB (A), nearly a 75% reduction from the noise produced by the former.

BRIEF DESCRIPTION OF THE DRAWINGS

Other features and advantages of the present invention will be more readily understood from the following detailed description of specific embodiments with reference to the accompanying drawings, in which FIG. 1 is a schematic diagram illustrating an integral air conditioner, of which an indoor unit and an outdoor unit are connected elastically according to the present invention.

FIG. 2 is a view in the direction shown by arrow A in FIG. 1.

FIG. 3 is a cross sectional view of a first embodiment of the elastic connecting means of the integral air conditioner according to the present invention.

FIG. 4 is a cross sectional view of a second embodiment of the elastic connecting means of the integral air conditioner according to the present invention.

FIG. 5 is a cross sectional view of a third embodiment of the elastic connecting means of the integral air conditioner according to the invention.

FIG. 6 is a cross sectional view of a fourth embodiment of the elastic connecting means of the integral air conditioner according to the present invention.

DETAILED DESCRIPTION OF THE PRESENT INVENTION

FIG. 1 is a schematic view showing an integral air conditioner according to the present invention, of which an indoor unit (1) and an outdoor unit (3) are elastically and integrally connected at four corners thereof or at appropriate positions by an elastic connecting means (2). FIG. 2 is a view in the direction shown by arrow A in FIG. 1. The indoor unit (1) consists of an indoor motor (6), an indoor crossflow blower (5), an indoor heat exchanger (4) and indoor unit wall panel (12). The outdoor unit (3) consists of a compressor (8), an outdoor motor (9), an outdoor fan (10), an outdoor heat exchanger (11) and outdoor unit wall panel (14). A sound absorbing plate (7) is sandwiched between said indoor unit and outdoor unit. Refrigerant conduit (22) establishes a means to transmit refrigerant through the various components of the indoor and outdoor units.

Embodiment 1

FIG. 3 shows a cross sectional view of a rubber bolt combined connecting means, the first embodiment of the elastic connecting means (2) of the integral air conditioner according to the present invention. Said elastic connecting means is formed by molding a rubber tube (13) to contain two bolts (16) each of which has an integrally formed washer (17) having the same diameter as said rubber tube (13), for example, φ25 mm. Said bolts can be common bolts, for example, having size of M8×15 mm (i.e. 8 mm in diameter and 15 mm in length), and are set coaxially with their ends parted from each other for a certain distance. And the rubber tube (13) may have a length of about 20 mm.

The indoor unit (1) and outdoor unit (3) of the integral air conditioner according to the present invention are connected by said rubber bolt combined connecting means in the manner of, drilling 4 holes of φ8.5 mm at 4 corners in the indoor unit wall panel (12) and outdoor unit wall panel (14), respectively; inserting said bolts (16) of said combined connecting means (2) formed by the above mentioned way into the holes of wall panels (12) and (14) respectively; then sandwiching a sound absorbing plate (7) between the indoor unit wall panel (12) and outdoor unit wall panel (14); and finally screwing the nuts (15) of M8 (8 mm in inside diameter) on said bolts (16) so that the indoor unit (1) and outdoor unit (3) are fixed integrally but elastically.

Embodiment 2

FIG. 4 is a cross sectional view of a bolt rubber supporting washer connecting means, the second embodiment of the elastic connecting means (2) of the integral air conditioner according to the present invention. Said bolt rubber supporting washer connecting means includes a bolt (16) which has an integrally formed end washer (17), a rubber supporting washer (13a), a rubber washer (13b), a metal washer (18) and a nut (15).

The indoor unit (1) and outdoor unit (3) of the integral air conditioner according to the present invention are connected by said bolt rubber supporting washer connecting means in the manner of that holes 8.5 mm in diameter are drilled in the indoor unit wall panel (12); then the bolt (16), which is a M8×60 mm bolt having an integrally formed end washer (17) 25 mm in diameter, is inserted through said hole; said end washer (17) is welded on the wall panel (12); a rubber supporting washer (13a) with a diameter of 30 mm, thickness of 30 mm, and a through hole about 8 mm in diameter is put on the bolt (16) which has already been fixed to the wall panel (12); the outdoor unit wall panel (14) is stamped at the places corresponding to each of the holes of the indoor unit wall panel (12) to form recesses of about 30 mm in diameter and about 10 mm in depth, and a hole about 14 mm in diameter is drilled in each of the recesses; then the bolt (16) with said rubber supporting washer (13a) sleeved thereon is inserted through said hole so that the washer (13a) is positioned into the recess; then a rubber washer (13b) about 30 mm in diameter and about 1.5 mm in thickness and a metal washer (18) about 30 mm in diameter and about 1.5 mm in thickness, each of which has a central hole about 9 mm in diameter, are put on the bole (16); finally a nut (15) of M8 is screwed on the bolt (16) so as to connect said indoor unit (1) and outdoor unit (3) integrally but elastically. A sound absorbing plate (7) can be sandwiched at suitable place between the connecting means (2) and indoor unit wall panel (12) or the outdoor unit wall panel (14).

Embodiment 3

FIG. 5 is a cross sectional view of a bolt rubber cross supporting connecting means, the third embodiment of the elastic connecting means (2) of the integral air conditioner according to the present invention. The bolt rubber cross supporting connecting means includes a bolt (16) having an integrally formed end washer (17), a rubber supporting washer (13a) a rubber intermediate washer (13b), a rubber washer (13c), a metal washer (18) and a nut (15).

The indoor unit (1) and the outdoor unit (3) of the integral air conditioner according to the present invention is connected by said bolt rubber cross supporting connecting means in the manner of, drilling 4 holes of φ8.5 mm at 4 corners of the indoor unit wall panel (12); inserting the bolt (16) of M8×60 mm having an end washer (17) of φ25 mm through each hole and welding said end washer (17) on the wall panel (12); putting the rubber supporting washer (13a) of φ30×20 mm having a central hole of φ8 mm on the bolt (16); then stamping the outdoor unit wall panel (14b) at the places corresponding to each of the holes of the indoor unit wall panel (12) to form recessess about 30 mm in diameter and about 10 mm in depth, and drilling holes of φ14 mm on the outdoor unit wall panel (14a) and said recesses of the outdoor unit wall panel (14b) respectively; then putting a rubber intermediate washer (13b) of φ30×10 mm with a hole of φ8 mm into said recess, and welding the outdoor unit wall panels (14a) and (14b) together to form a wall panel assembly; driving the bolt (16) which has already been sleeved by the rubber supporting washer (13a) through a sound absorbing plate (7) and said outdoor unit wall panel assembly, on which putting a rubber washer (13c) of φ30×10 mm having a central hole of φ8 mm and a metal washer (18) of φ25×1.5 mm having a central hole of φ9 mm; then screwing a nut (15) of M8 on said bolt (16) so that an integral air conditioner is constituted by elastically connecting of the indoor unit (1) and outdoor unit (3).

EMBODIMENT 4

FIG. 6 is a cross sectional view of a bolt hollow rubber washer connecting means, the fourth embodiment of the elastic connecting means (2) of the integral air conditioner according to the present invention. Said bolt hollow rubber washer connecting means includes a bolt (16) with an integrally formed end washer (17), a hollow rubber washer (13) with an undulate outer surface, and a nut (15) with an integrally formed washer.

The indoor unit (1) and the outdoor unit (3) of the integral air conditioner according to the present invention is connected by each of said bolt hollow rubber washer connecting means in the manner of that a hollow rubber washer (13) is formed about 35 mm in outside diameter and about 35 mm in length with a hole about 20 mm in diameter in middle portion (19) and about 10 mm in diameter at two ends, and its outer surface is formed in an undalate shape and has a groove about 20 mm in outer diameter and about 6 mm in width at one end; 4 holes about 35 mm in diameter and 4 holes about 8 mm in diameter are drilled at the corners of the sound absorbing plate (7) and the indoor unit wall panel (12), respectively, and each of said bolt (16) is driven through each hole of the indoor unit wall panel (12), then each of said end washer (17) is welded on the wall panel (12), respectively; holes 20 mm in diameter is drilled in the outdoor unit wall panel (14) corresponding to those of indoor unit wall panel (12) so that each of the holes has a protruding outer flange (14) 6 mm in width, then the end having said groove of the hollow rubber washer (13) is inserted into said hole of the wall panel (14) by embedding said outer flange (14) into said groove; then the bolt (16) welded on the indoor unit wall panel (12) is driven through said hollow rubber washer (13) and said hole of the sound absorbing plate (7); then the nut (15) is screwed on said bolt (16) so as to connect the indoor unit (1) and the outdoor unit (3) integrally but elastically.

The description of the preferred embodiments contained herein is intended by no way to limit the scope of the invention. As will be apparent to a person skilled in the art, various modifications and adaptations of the above described structure can be made without departing from the spirit and scope of the invention, the scope of which is defined in the appended claims.

What is claimed is:

1. An integral air conditioner, comprising;
   an indoor unit including an indoor motor, an indoor crossflow blower, an indoor heat exchanger, and an indoor unit wall panel;
   an outdoor unit including an outdoor motor, a compressor, an outdoor fan, an outdoor heat exchanger, and an outdoor unit wall panel mounted in parallel to said indoor unit wall panel;
   a sound absorbing plate in close proximity and parallel to said indoor unit wall panel and said outdoor unit wall panel;
   means for transmission of refrigerant, which are connected between said indoor unit and said outdoor unit without adjustable connectors; and
   elastic connecting means comprising bolts and rubber vibration absorption members connecting said indoor unit wall panel with said outdoor unit wall panel to form a unitary air conditioner body and inhibit transmission of vibrations from the outdoor unit to the indoor unit.

2. An integral air-conditioner of claim 1, wherein said elastic connecting means (2) is a rubber-bolt combined connecting means formed by molding a rubber tube (13) containing two bolts (16) each of which has an integrally formed wasker (17), and said bolts are inserted through holes of said indoor portion wall panel (12) and outdoor portion wall panel (14) and nutted by a nut (15) so as to make said indoor portion (1) and outdoor portion (3) integral in structure.

3. An integral air-conditioner according to claim 1, wherein, said elastic connecting means (2) is a bolt-rubber supporting connecting means consisting of a bolt (16) having an integrally formed end washer (17), a rubber supporting washer (13a) a rubber washer (13b), a metal washer (18) and a nut (15); and said bolt (16) is driven through the indoor portion wall panel (12) on which said end washer (17) is welded, and said rubber supporting washer (13a) is positioned into a recess of said outdoor portion wall panel (14); then said bolt (16) is driven through said rubber supporting washer (13a), the outdoor portion wall panel (14), said rubber washer (13b) and said metal washer (18); and said nut (15) is screwed on said bolt (16) so that said indoor portion (1) and outdoor portion (3) are integrally connected in structure.

4. An integral air-conditioner according to claim 1, wherein, said elastic connecting means (2) is a bolt-rubber cross-supporting connecting means consisting of a bolt (16) having an integrally formed end washer (17), a rubber supporting washer (13a), a intermediate rubber washer (13b), a rubber washer (13c), a metal washer (18) and a nut (15); and said bolt (16) is driven through said indoor portion wall panel (12) on which said end washer (17) is welded, and said intermediate rubber washer (13b) is positioned between two outdoor portio wall panels (14) and (14') to form an assembly; then said bolt (16) is driven through said rubber supporting washer (13a), said assembly, said rubber washer (13c) and said metal washer (18); then said nut (15) is screwed on said bolt (16) so that said indoor portion (1) and outdoor portion (3) are integrally connected in structure.

5. The integral air conditioner of claim 1;
   wherein each of said elastic connecting means includes:
   at least one nut having an integrally formed washer;
   at least one bolt having an integrally formed end washer;
   and at least one hollow rubber washer of which the middle portion has an inside diameter larger than that of two ends, and the outer surface is undulate and has a groove at one end for receiving said flanged hole.

6. An integral air-conditioner according to claim 1, wherein, said elastic connecting means is a spring connecting means consisting of a bolt (16) having an integrally formed end washer (17), a nut (15), a spring (20) and two concave locating rings (21); and said spring (20) is welded on said concave locating rings (21) at each end, respectively to form an assembly; then said bolt (16) is inserted through said indoor portion wall panel (14), said assembly and said outdoor portion wall panel (12); then said nut (15) is screwed on said bolt (16) so as to make said indoor portion (1) and outdoor portion (3) integral in structure.

7. The integral air conditioner of claim 1, wherein said elastic connecting means is used in a manner which separates said indoor unit from said outdoor unit so as to prevent contact between said outdoor unit and any metal members such as bolts, nuts and said outdoor unit wall panel.

* * * * *